United States Patent [19]

Neylan et al.

[11] Patent Number: 5,340,603
[45] Date of Patent: Aug. 23, 1994

[54] NUTRITIONAL PRODUCT FOR HUMAN INFANTS HAVING CHRONIC LUNG DISEASE

[75] Inventors: Michael J. Neylan, Worthington; Karin M. Ostrom, Reynoldsburg; Helen R. Churella, Columbus; Merlin D. Breen, Westerville; John D. Benson, Powell, all of Ohio

[73] Assignee: Abbott Laboratories, Abbott Park, Ill.

[21] Appl. No.: 114,033

[22] Filed: Aug. 30, 1993

[51] Int. Cl.5 ............................................. A23C 11/10
[52] U.S. Cl. ........................................ 426/73; 426/74; 426/580; 426/590; 426/601; 426/607; 426/656; 426/658; 426/801; 426/72
[58] Field of Search ............... 426/801, 607, 658, 656, 426/74, 580, 590, 601

[56] References Cited

PUBLICATIONS

Brooke et al, 1976, "High Fat Feeding in Immature Infants", Nutri. Metab. 21 (Suppl. 1): 104–106 (1977).
"Pulmonary Disease Following Respirator Therapy of Hyaline-Membrane Disease: Bronchopulmonary Disease", W. H. Northway, R. C. Rosan and D. Y. Porter, The New England Journal of Medicine; vol. 276, pp. 357–368, 1967.
"Implications of Nutrition in Oxygen-Related Pulmonary Disease in the Human Premature Infant", R. J. Robert, Adv. Pharm. Ther. vol. 8, pp. 43–64, 1978.
"Inositol Supplementation in Premature Infants with Respiratory Distress Syndrome", M. Hallman et al. The New England, vol. 326, pp. 1233–1239, 1992.
"Specialized Nutrition for Pulmonary Patients" Ross Laboratories Handbook, Nov. 1986.
"The Pulmonary Formula Balanced for Tolerance Carnation", Nutrient, Clintec Product Handbook, 1991.
"Meeting the Special Nutrient Needs of Low-Birth-Weight Infants", Ross Laboratories, Columbus, Ohio, May, 1991.

*Primary Examiner*—Helen Pratt
*Attorney, Agent, or Firm*—Lonnie R. Drayer; Donald O. Nickey

[57] ABSTRACT

A hypercaloric formula providing nutritional support for human infants having chronic lung disease, said formula having a caloric density of at least 800 kcalories per liter of formula and wherein not less than 56% of the total calories in said formula is derived from fat; not more than 15% of total calories is derived from a high quality protein source; and from about 20–27% of total calories is from a carbohydrate source; said formula having a calcium to phosphorous ratio in the range of 1.4 to 2.2, and having an m-inositol concentration of at least 50 milligrams per liter of formula.

13 Claims, No Drawings

NUTRITIONAL PRODUCT FOR HUMAN INFANTS HAVING CHRONIC LUNG DISEASE

FIELD OF THE INVENTION

The present invention relates generally to a liquid nutritional product, and more particularly to a nutritional product specially formulated for use in the management of human infants having compromised lung function.

BACKGROUND OF THE INVENTION

During the third trimester of pregnancy, growth of the fetus is greater than at any other time in its development. Of an estimated 4.2 million live births in the United States each year, approximately 383,000 (about 9%) occur prematurely. A low birth-weight infant or any infant born prematurely misses part or all of the critical period of in utero growth, and therefore, would benefit from a nutritional formula that contains greater amounts of nutrients than are found in standard infant formulas or in breast milk in order to support nutrient accretion at the in utero rate leading to growth and development of the infant. Further, a nutritional formula for low birth weight infants must provide these nutrients without disrupting or stressing the physiologic and metabolic systems of the preterm infant that are not yet fully developed.

The most common medical problem encountered in the premature infant is respiratory in origin often due to a lack of pulmonary development. For example, respiratory distress syndrome, aspiration syndromes, and pneumonia frequently occur in the first hours of life. As a consequence, these infants suffer from bloodlung gas exchange disorders which most typically result in a blood level of carbon dioxide which is clinically considered too high and an oxygen level which is considered too low. Aggressive medical intervention is required to treat these infants and includes the administration of supplemental oxygen, endotracheal intubation and mechanical ventilation with positive pressure respirators.

Such aggressive therapy and the underlying diseases themselves result in chronic pulmonary damage which persists beyond the first four weeks of life in approximately 18% of these premature infants. This chronic pulmonary disease, termed bronchopulmonary dysplasia (BPD), is currently the most common and persistent complication of respiratory disease in premature babies and constitutes the majority of infants hospitalized chronically in modern intensive care nuseries.

Bronchopulmonary dysplasia (BPD) is a chronic lung disease of infancy and early childhood which is a well-recognized, but poorly defined, clinical entity first described by Northway et al in "Pulmonary Disease Following Respiratory Therapy of Hyaline Membrane Disease", *New England Journal of Medicine;* 296:357 (1967). This diagnosis is most frequently assigned to infants who are born prematurely, require supplemental oxygen and ventilatory support for respiratory distress syndrome (RDS), and demonstrate clinical and roentgenographic evidence of chronic lung disease at twenty eight to thirty days of life. Four factors are believed to be important in the pathogenesis of this disease: 1) susceptibility of the infant (for example, immature lungs); 2) early acute lung damage; 3) secondary injury by oxidants and/or proteolytic enzymes; and 4) abnormal lung development and/or poor healing.

Structural and biochemical immaturity of the lungs influence the response to and recovery from neonatal lung disease and oxygen therapy. Immaturity of the antioxidant defense systems of the lungs of premature infants may further exacerbate the condition of the compromised lungs and impair the healing process. Surfactant deficiency and/or immaturity result in increased epithelial permeability and increased airway distensibility of the lungs. These factors predispose lung tissue to the development of epithelial necrosis in the small airways.

While barotrauma—induced lesions from oxygen administration by mechanical ventilation—may represent the initial lung injury, development of the more chronic lung condition (BPD) is influenced by secondary injury caused by oxidants and/or proteolytic enzymes. Sources of oxidant injury in addition to therapeutic oxygen include xanthine oxidase-generated radicals and oxygen radicals generated by white blood cells attracted to lung tissue by bacterial infection. Continued therapeutic oxygen administration interferes with lung repair and healing by prolonging interstitial edema and inhibiting DNA synthesis.

Carbon dioxide retention, systemic hypertension, electrolyte derangements, hypercalciuria, osteopenia, a mixed acid-base disorder consisting of chronic respiratory acidoses with compensatory metabolic alkalosis, and hypoproteinemia are representative of the metabolic and nutritional status of the infant with BPD. Failure to grow is often observed in these infants and is of major clinical significance.

Nutritional status is associated with tolerance to hyperoxia and the process of pulmonary repair during the acute phases of neonatal lung disease. Failure to provide adequate energy to an infant having a chronic lung disease has been shown to aggravate the effects of oxygen-induced lung damage. (Roberts, "Implications of Nutrition in Oxygen-Related Pulmonary Disease in the Premature Infant", *Advances in Pharmacology Therapy;* 8:43 (1978)). However, there is disagreement regarding the potential therapeutic role specific nutrients may have in preventing RDS and/or in ameliorating both the acute phases and the resultant chronic conditions associated with BPD. Vitamin A (retinol), inositol, and a number of other nutrients that have antioxidant effects have received recent interest.

Inositol is a component of cell membrane phospholipids, and compounds containing inositol are important in signal transduction. Inositol influences cellular function and organ maturation. A deficiency of inositol is associated with fatty liver, intestinal lipodystrophy and a lack of infant growth. (M. Hallman et al, New England J. Medicine, Volume 326, pages 1233-1239, 1992). This publication further suggests that parenteral administration of inositol to preterm or low birth weight infants with respiratory problems resulted in: decreased severity of the pulmonary problems; decreased mortality resulting from the respiratory problems; decreased retinopathy and blindness caused by it. It is believed that inositol therapy reduces respiratory problems in preterm infants by acting as a substrate for enhancing the synthesis and secretion of lung surfactant phospholipids. Thus, inositol supplementation during the early neonatal period decreases the likelihood of severe, chronic injury of the retina and lungs of premature infants.

Bronchopulmonary dysplasia (BPD) is characterized by oxygen dependency and radiographic changes in the lungs. Infants diagnosed with BPD frequently exhibit abnormal growth and development in conjunction with markedly elevated blood carbon dioxide levels. In addition, systemic hypertension has been observed in patients with BPD prompting restriction of sodium and fluid intakes to lessen the likelihood of pulmonary edema. Calcium metabolism in these infants is often compromised by the administration of the drugs furosemide or theophylline. These clinical practices may contribute to the osteopenia frequently reported in infants with BPD as well as to the fluid and electrolyte alterations of hypernatremia, hypochloremia, dehydration and/or hypocalcemia. To further complicate the metabolism and homeostasis required for normal growth and development, these infants frequently exhibit acid-base disorders. This is generally a mixed acid-base disorder consisting of chronic respiratory acidosis followed by the compensatory metabolic alkalosis. Further, to avoid potential lung damage during the administration of oxygen in the ventilation process, the biological antioxidant systems of these infants need to be operating at a maximum efficiency. The efficiency of these antioxidant systems can be increased by feeding the infants compositions containing compounds such as vitamin E, selenium, and beta-carotene.

Nutritional support is the primary focus in the management of BPD since the scarred and fibrotic lungs must be provided with the substrates to support healing and to promote infant lung and somatic growth. Numerous clinical investigators have reported increased nutritional requirements for infants with acute or chronic lung problems. Increased oxygen demand is due, in part, to the increased work of breathing and increased demand for cardiac output. Moreover, metabolic demands may result in increased carbon dioxide production which contributes to the excretory load placed on an already compromised lung. As a result of a taxed nutritional status, brain growth may be slighted, lean body mass may be lower than normal, and short stature may ensue.

Thus, it is useful to feed infants with acute or chronic lung disorders a nutritional formula which results in a decreased carbon dioxide production. It is well known that the complete combustion of one mole of carbohydrate produces more carbon dioxide than the complete combustion of one mole of fat relative to the amount of oxygen consumed in in vitro calorimetry studies. This same phenomenon occurs when these fuels are combusted, or oxidized, in the human body. Thus a diet rich in fat and poor in carbohydrate would be expected to result in a lower excretory burden on the lungs than a diet rich in carbohydrate due to the lower carbon dioxide load produced. This in fact has been shown in adults where fat rich and carbohydrate poor diets result in an decreased respiratory quotient and rate of carbon dioxide production. In addition there was also an improvement in pulmonary function in adults fed a high fat diet, as measured by a decrease in minute ventilation, i.e. number of breaths per minute multiplied by total lung volume.

Low birth-weight infants with compromised lung function need to be fed nutritional formulas which not only meet the criteria noted above to support infant growth but which in addition do not cause distress to the immature pulmonary system. However, the nutritional requirements of infants with chronic lung disorders such as BPD are often difficult to meet because of the necessity to restrict fluid intake, poor digestive tolerance of the formula, and/or increased energy demands resulting from the excess work of breathing due to compromised lung function and to repair injured pulmonary tissue. Fluid intake is restricted in an effort to reduce the level of pulmonary edema. Further, the feeding difficulties resulting from chronic respiratory distress or from developmental delay of these infants frequently prevent their consumption of the minimum nutrient intakes of between 130–150 kcal/kg body weight which are known to be required to support adequate growth. In comparison, normal low birth weight infants who do not have compromised lung function require a daily energy intake of only about 120 kcal/kg body weight.

It is clear from the above discussion that there is an urgent medical need for the development of specialized infant nutrient formulas which not only provide the energy, vitamin, mineral and essential elements necessary to support ex utero growth but which also have an increased caloric density in order to accomodate the fluid intake restrictions commonly encountered in the treatment of infants with compromised lung function. Furthermore it is useful to consider feeding such infants a nutritional formula which results in decreased carbon dioxide production. Calorically dense compositions wherein the calories are derived from an increased fat and decreased carbohydrate content as compared to existing prior art infant formulas may achieve this objective. Such compositions, especially when also supplemented with inositol and antioxidants, are useful in the clinical treatment of preterm infants having cardiovascular or chronic lung conditions and also in the treatment of extremely low birth weight infants (i.e. those infants weighing less than 1000 grams at birth). Such an infant formula composition would also serve to overcome problems associated with microbial contamination resulting from physically adding caloric supplements to currently available infant formulas at, or shortly before, the time of feeding of the infant.

The instant Invention meets the nutritional needs of low birth weight and/or premature infants having compromised lung function. The Invention meets these needs by supplying a calorically dense nutritional formula which not only contains all the essential minerals, vitamins and energy requirements to fully support infant growth at the in utero rate but which in addition reduces the physiological stress applied to the underdeveloped organs of the premature infant. The nutritional product of the Invention is substantially more calorically dense than any prior art infant formula compositions and also supplies over 60% of the needed calories in the form of fat thereby decreasing the rate of carbon dioxide production. Further as a consequence of the above, the work of breathing, a measure of pulmonary effort, is also decreased. Also because of the increased caloric density of the formula of the instant Invention, this product is able to deliver appropriate nutrient levels in a diminished volume.

DISCUSSION OF THE PRIOR ART

For the sake of clarity, the relevant prior art is discussed from two separate aspects:
a) Nutritional formulas suitable for ingestion by adults versus infants; and
b) Nutritional formulas which upon ingestion effect reduced carbon dioxide production following metabolism.

Currently available nutritional formulas may be divided into two broad categories: those compositions which are developed specifically for the ingestion by human adults versus those formulations developed for human infants. The distinction between the two groups is based on differences in nutrient and energy requirements as discussed below. Nutrient and energy requirements of the infant on an equivalent body weight basis are greater than for the adult. This is because of the rapid growth rate of the infant in comparision to that of the adult. The adult has only maintenance, not growth, requirements for nutrients and energy. Thus infant formulas are required to have a high fat content to supply the energy needs of growth whereas the adult formula is required to be lower in fat content in order to obviate weight gain concerns. Further, infant formulas are required to contain substantially higher concentrations of minerals and vitamins in order to support infant growth.

In addition to the above, the prior art may be subdivided into nutritional formulas which facilitate reduced carbon dioxide production. As noted previously, decreased carbon dioxide production can be achieved by increasing the fat content relative to the carbohydrate and protein contents of a formula. Adult nutritional formulas which effect reduced carbon dioxide production have been disclosed in the literature. Examples of these are the commercially available PULMOCARE® and NUTRIVENT® products which are discussed further below. In view of their nutrient composition both of these formulations, however, are suitable for adults only; i.e. given their relatively high protein concentration and low vitamin and essential trace element concentrations these products are not suitable for supporting infant growth. To date no nutritional formulas which effect reduced carbon dioxide production and which are suitable for ingestion by infants have been made public. The relevant prior art is discussed below.

Published European Patent Application 0 395 865 discloses an enteral diet for patients with pulmonary disease. The disclosed composition would not support the growth requirements of low birth weight infants.

PULMOCARE® is a nutritional product which is distributed commercially by the Ross Products Division of Abbott Laboratories, U.S.A. PULMOCARE® is a high fat, low carbohydrate enteral formula, designed to reduce carbon dioxide production, thereby minimizing $CO_2$ retention resulting from chronic obstructive pulmonary disease or acute respiratory failure. PULMOCARE® is specially formulated to meet the USDA's recommended daily allowance for healthy adults and has a caloric density of 44.4 kilocalories per fluid ounce. Since the PULMOCARE® product was specifically designed for adults with respiratory problems, the formulation has a relatively high protein and low total vitamin and essential mineral content. As a consequence PULMOCARE® is not suitable for supporting growth of low birth weight infants with respiratory problems since it does not meet the required fat, mineral and vitamin needs of these infants. Further, the PULMOCARE® product does not contain inositol. In contrast the product of the instant invention, hereinafter also referred to as "BPD30", not only solves the problem of decreasing carbon dioxide production in infants with respiratory problems but it also is specifically designed to support infant growth as well as providing a high concentration of inositol.

NUTRIVENT® is an enteral nutritional formulation distributed by Clintec Nutrition Company, Deerfield, Ill., U.S.A. NUTRIVENT® is designed to offer pulmonary benefits to adults with respiratory problems. Like the aforenoted PULMOCARE® product, NUTRIVENT® is also a high protein, low total vitamin composition suitable for ingestion by adults and does not contain inositol. This product is also not suitable for supporting the growth of low birth weight infants with respiratory problems since it to does not meet the required fat, mineral and vitamin needs of these infants. In contrast the BPD30 product of the instant invention not only solves the problem of decreasing carbon dioxide production in infants with respiratory problems but it also is specifically designed to support infant growth as well as providing a high concentration of inositol.

Furthermore, neither PULMOCARE® nor NUTRIVENT® provide sufficent calcium (Ca) and phosphorous (P) and more specifically do not provide the Ca:P ratio that the American Academy of Pediatrics (AAP) recommends for infant formula used in the feeding of low birth weight infants. The product of the instant invention has a, Ca:P value of 1.8, whereas PULMOCARE® and NUTRIVENT® have CA:P ratios of only 1:0. AAP recommends a Ca:P ratio of at least 1.2.

SIMILAC SPECIAL CARE®24, hereinafter also referred to as SSC24, is a nutritional product which is distributed commercially by the Ross Products Division of Abbott Laboratories, U.S.A. This product is specifically designed for enteral feeding of low birth weight infants and supports infant growth. However, in comparison to the BPD30 product of the instant Invention, SSC24 is a relatively low fat, high carbohydrate composition and therefore does not alleviate problems related to increased carbon dioxide production commonly found in infants with respiratory problems. An infant fed SSC24 derives 11% of its calories from the protein constituents, 42% from the carbohydrates and 47% from fat. In contrast an infant fed the BPD30 product of the instant Invention derives 11% of its calories from protein, 22% from carbohydrates and 67% from fat. SSC24 contains only a minimal level of inositol (5.5 mg per 100 kilocalories). In contrast the BPD30 product of the instant invention not only solves the problem of decreasing carbon dioxide production in infants with respiratory problems, by having an increased fat content, but it also is specifically designed to support infant growth as well as providing a high concentration of inositol (60 mg per 100 kilocalories). As noted previously, inositol acts as a substrate material for enhancing the synthesis and secretion of lung surfactant phospholipids thereby reducing respiratory problems. Further, the increased caloric density of the BPD30 product enables the infants to receive the necessary calories in a smaller volume of formula thereby avoiding the problems associated with fluid overload.

For the sake of clarity and ease of understanding the major differences in the macronutrient (fat, carbohydrate, protein, mineral and vitamin) and inositol composition of the aforenoted products are summarized in Table 1. This comparative description clearly reveals that the preferred composition of the instant Invention (BPD30) is a composition having a relatively low concentration of protein and carbohydrates and is a high fat, high vitamin and high inositol composition suitable for feeding infants with respiratory problems since ingestion of this composition not only fully supports infant growth but also results in decreased carbon dioxide production. It is also clear from this comparison that the prior art adult products, PULMOCARE® and NUTRIVENT®, are comparatively high in protein and carbohydrate content and comparatively low in vitamin, mineral and fat content. Also these products have a low Ca:P ratio, low vitamin A, selenium and copper content and a iron content which is considered too high for infant formulas. As a consequence these products are not suitable for feeding preterm low birth-weight infants with respiratory disorders. The closest prior art product, SSC24, is comparatively high in carbohydrate and low in fat content having a lower caloric density and therefore is not suitable for feeding preterm low birth-weight infants having compromised pulmonary function.

TABLE 1

COMPARISON OF PRIOR ART COMPOSITIONS

|  | PULMOCARE ® | NUTRIVENT ® | SSC24 | BPD30 (Invention) |
|---|---|---|---|---|
| 1. Calories derived from: | | | | |
| Protein (%) | 17 | 18 | 11 | 11 |
| Carbohydrates (%) | 28 | 36 | 42 | 22 |
| Fate (%) | 55 | 46 | 47 | 67 |
| 2. Ca & P Content (mg/100 kilocalories): | | | | |
| Calcium | 70 | 67 | 150 | 150 |
| Phosphorous | 70 | 100 | 83 | 83 |
| Ca:P Ratio | 1.0 | 1.0 | 1.8 | 1.8 |
| 3. Vitamins/Trace Elements (per 100 kilocalories) | | | | |
| Selenium (μg) | — | 4 | 3.0 | 3.0 |
| Iron (μg) | 1800 | 1200 | 700–1800 | 700 |
| Copper (μg) | 140 | 140 | 200 | 200 |
| Vitamin A (IU) | 350 | 340 | 650 | 650 |
| 4. Inositol (mg/100 kilocalories) | 0 | 0 | 5.5 | 60 |
| 5. Caloric Density | | | | |
| (kilocalories/mL) | 1.5 | 1.2 | 0.8 | 1.0 |
| (kilocalories/Fl. Ounce) | 44.4 | 35.5 | 24.0 | 30.0 |

DETAILED DESCRIPTION OF THE INVENTION

Awareness of feeding difficulties in infants with chronic lung disorders such as BPD, and of other preterm infant conditions, such as those experienced by extremely low birth weight infants with cardiovascular conditions, requiring treatment with a hypercaloric diet led to the development of a high fat, inositol rich, low carbohydrate, calorically dense nutritional product suitable for use in infants. The formula, according to the Invention, has the following general characteristics: an energy density of 30 kcal/fluid oz; 67% of calories provided by fat; reduced amount of sodium; slightly elevated levels of vitamins A, E, and potassium, chloride, selenium, zinc, manganese and copper; appropriate levels of calcium and phosphorus; increased inositol levels; and appropriate iron levels. With the exception of the high fat and inositol content of this formula, the levels of nutrients are within the ranges recommended by the American Academy of Pediatrics for extremely low birth weight premature infants.

As shown in Table 1, the product of the instant Invention is an energy- and nutrient-dense infant formula containing greater concentrations of fat and inositol than those contained in SIMILAC SPECIAL CARE with Iron 24 (SSC24). The SSC24 infant formula composition is the closest prior art composition and was used as a control in the comparative studies reported below. The ingredients and nutritional information for SSC24 are listed respectively in Table 2 and Table 3.

TABLE 2

INGREDIENTS OF SIMILAC SPECIAL CARE with Iron 24 (Control Formula).

| Water: | |
|---|---|
| protein | (nonfat milk, whey protein concentrate); |
| carbohydrates | (hydrolyzed cornstarch, lactose); |
| fat | (fractionated coconut oil (medium-chain triglycerides), soy oil, coconut oil); |
| minerals | (calcium phosphate tribasic, sodium citrate, magnesium chloride, calcium carbonate, potassium citrate, potassium chloride, ferrous sulfate, zinc sulfate, cupric sulfate, manganese sulfate); |
| vitamins | (ascorbic acid, choline chloride, m-inositol, niacinamide, alpha-tocopheryl acetate, calcium pantothenate, riboflavin, vitamin A palmitate, thiamine chloride hydrochloride, pyridoxine hydrochloride, biotin, folic acid, phylloquinone, vitamin D₃, cyanocobalamin); and |
| other | (mono- and diglycerides, soy lecithin, carrageenan, taurine and L-carnitine). |

TABLE 3

NUTRITIONAL INFORMATION FOR SIMILAC SPECIAL CARE WITH IRON 24
(Control Formula: 4.2 fl. oz. of ready to feed product provide 100 kilocalories; values given are per 100 kilocalories or per liter of ready-to-feed product as indicated).

| | | Per 100 kcalories | Per Liter of Product |
|---|---|---|---|
| Nutrient | Protein | 2.71 g | 22.0 g |
| | Fat | 5.43 g | 44.1 g |
| | Carbohydate | 10.6 g | 86.1 g |
| Vitamins | Vitamin A | 680 IU | 5522 IU |
| | Vitamin D | 150 IU | 1218 IU |
| | Vitamin E | 4.0 IU | 32.5 IU |
| | Vitamin K | 12 μg | 97 μg |
| | Thiamine (Vit B₁) | 250 μg | 2030 μg |
| | Riboflavin (Vit B₂) | 620 μg | 5030 μg |
| | Vitamin B₆ | 250 μg | 2030 μg |
| | Vitamin B₁₂ | 0.55 μg | 4.5 μg |
| | Niacin | 5 mg | 40.6 mg |
| | Folic Acid (Folacin) | 37 μg | 300 g |
| | Pantothenic Acid | 1.9 mg | 15.4 mg |
| | Biotin | 37 μg | 300 μg |
| | Vitamin C (Ascorbic Acid) | 37 mg | 300 mg |
| | Choline | 10 mg | 81 mg |
| | m-Inositol | 5.5 mg | 44.7 mg |
| | L-Carnitine | 4.0 mg | 32.5 mg |
| Minerals | Calcium | 180 mg | 1462 mg |

TABLE 3-continued

NUTRITIONAL INFORMATION FOR SIMILAC
SPECIAL CARE WITH IRON 24
(Control Formula: 4.2 fl. oz. of ready to feed product
provide 100 kilocalories; values given are per 100
kilocalories or per liter of ready-to-feed product
as indicated).

|  | Per 100 kcalories | Per Liter of Product |
|---|---|---|
| Phosphorus | 90 mg | 731 mg |
| Magnesium | 12 mg | 97 mg |
| Iron | 1.8 mg | 14.6 mg |
| Zinc | 1.5 mg | 12.2 mg |
| Manganese | 12 µg | 97.4 µg |
| Copper | 250 µg | 203 µg |
| Iodine | 6 µg | 48.7 µg |
| Sodium | 43 mg | 349 mg |
| Potassium | 129 mg | 1047 mg |
| Chloride | 81 mg | 658 mg |
| Taurine | 6.0 mg | 48.7 mg |
| Selenium | 2.0 µg | 16.2 µg |
| Ca:P Ratio | 1.4 | 2.2 |

The product composition of the instant Invention is shown in Table 4.

TABLE 4

NUTRITIONAL INFORMATION FOR NEW BPD30
PRODUCT (Invention)
(Values given are per liter)

| NUTRIENT | | RANGE |
|---|---|---|
| Nutrient | Protein, g | 27.0–33.5 |
| | Fat, g | 68.0–76.0 |
| | Carbohydrate, g | 45.0–70.0 |
| Vitamins | Vitamin A, IU | 6500–12000 |
| | Vitamin D, IU | 1000–3000 |
| | Vitamin E, IU | 30–50 |
| | Vitamin $K_1$, µg | 120–150 |
| | Thiamine (Vitamin $B_1$), mg | 2.0–4.0 |
| | Riboflavin (Vitamin $B_2$), mg | 6.0–8.5 |
| | Vitamin $B_6$, mg | 2.5–4.5 |
| | Vitamin $B_{12}$, mg | 5.0–12.0 |
| | Niacin, mg | 40.0–80.0 |
| | Folic Acid (Folacin), µg | 250–500 |
| | Pantothenic Acid, mg | 19.0–40.0 |
| | Biotin, µg | 300–500 |
| | Vitamin C (Ascorbic Acid), mg | 200–500 |
| | Choline, mg | 100–300 |
| | m-Inositol, mg | 400–600 |
| | L-Carnitine, mg | 30–100 |
| Minerals | Calcium, mg | 1500–1850 |
| | Phosphorus, mg | 750–1030 |
| | Magnesium, mg | 120–170 |
| | Iron, mg | 4.0–7.5 |
| | Zinc, mg | 15.0–20.0 |
| | Manganese, µg | 120–400 |
| | Copper, mg | 2.0–3.2 |
| | Iodine, µg | 50–200 |
| | Sodium, mg | 300–500 |
| | Potassium, g | 1.2–1.6 |
| | Chloride, mg | 700–850 |
| | Taurine, mg | 50–80 |
| | Selenium, µg | 20–50 |
| | Ca:P Ratio | 1.4–2.2 |

A comparison of the composition of the product of this Invention (Table 4) with the composition of the prior art infant formula for low birth-weight infants, SSC24 (Table 3), clearly reveals that the instant Invention differs from the prior art in that it has an increased fat content and also has a reduced carbohydrate content. Further, the product of the instant Invention is enriched in terms of both energy and nutrient (i.e. caloric) density. The closest prior art product, SSC24, contains 24 kcal per fluid ounce (0.81 kilocalories per milliliter) whereas the product of the instant Invention contains 30 kcal per fluid ounce (1.0 kilocalories per milliliter). Further, the product of the instant Invention has a markedly increased inositol concentration: 5.5 mg per 100 kilocalories in SSC24 versus 60 mg per 100 kilocalories in the instant Invention.

Administration of a diet with an increased proportion of energy derived from fat and a decreased portion being derived from carbohydrate results in a decreased level of carbon dioxide production. As a consequence, the degree of potential lung injury due to mechanical ventilation and oxygen administration may be substantially reduced. Also, administration of a diet having the increased caloric density and relatively high concentrations of nutrients associated with the nutritional product of the instant Invention compensates for the reduced volume intakes due to fluid restriction and impaired feeding typically encountered in the population for which the product of the instant Invention is meant. Increased caloric density is of substantial clinical importance since it means that a patient requiring the same amount of nutrient (kcal) is able to ingest substantially less fluid volume and yet receive the same the number of kilocalories. Fluid intake restriction is of considerable importance in controlling the problems associated with edema, electrolyte imbalance, etc., commonly encountered in infants for which the nutritional formula of the instant Invention is designed. Further, the risk of microbial contamination or mixing errors is reduced since the need for caloric supplementation is eliminated.

The invention will be better understood in view of the following examples, which are illustrative only and should not be construed as limiting the Invention.

EXPERIMENTS

Experiments which have been conducted regarding this Invention consists essentially of three parts:
1) Composition of the Product;
2) Clinical Evaluation of the Product; and
3) Manufacture of the Product.

COMPOSITION OF THE INFANT FORMULA

EXAMPLE 1

Control

The control formula was the commercially available SIMILAC SPECIAL CARE® 24 (SSC24) formula having the composition noted in Tables 2 & 3. SSC24 is specifically designed for feeding low birth weight infants and provides all the nutrients needed daily for achieving growth at intrauterine rates, without disrupting or placing a stress on physiological systems that are not yet fully developed such as the kidneys, liver, etc. The SSC24 infant formula, however, was not designed to accomodate the caloric requirements of infants with pulmonary disorders.

EXAMPLE 2

Invention

While the product of the instant Invention comprises essentially the same ingredients as SSC24, the relative proportions of those ingredients are markedly different and give rise to a high fat, high inositol, low carbohydrate product. BPD30 is a calorically dense, high fat, low carbohydrate formula having a caloric density of 30 kcal per fluid ounce.

The nutritional information for this new product is presented in Table 4.

As can be seen by a comparison with the control formula (SSC24), the compositions are similar except for the macronutrient concentrations. In the BPD30 formula of the instant Invention, the proportion of calories derived from the macronutrients was approximately 11% protein, 22% carbohydrate and 67% fat as compared to 11% protein, 42% carbohydrate and 47% fat in SSC24. Further, inositol is present in the BPD30 product of the instant Invention at about 60 mg/100 kilocalories as compared to about 5.5 mg/100 kilocalories in the control SSC24 formula. The protein source for both the SSC24 and BPD30 formulations is non-fat dry milk powder and whey protein concentrate, the fat source is a blend of soy and coconut oils, and the carbohydrate source is lactose and corn syrup.

CLINICAL STUDIES TO EVALUATE THE EFFECTS OF FEEDING LOW BIRTH-WEIGHT INFANTS VARIOUS INFANT FORMULA COMPOSITIONS

EXAMPLE 3

Clinical Comparison

The effects of feeding the formula of Example 1 were compared with the results obtained when the infants were fed the product of the instant Invention, Example 2. These studies are discussed next.

Measurement of respiratory gas exchange and pulmonary function in children, especially in preterm infants, is difficult due to the low volumes of gas exchanged. Thus, in order to determine the effect of feeding infants a high fat, low carbohydrate nutritional formula three independent studies were conducted.

The infants enrolled in Study #1 were well enough that they could be weaned from supplemental oxygen therapy. In contrast, the infants enrolled in Study #2 as well as those enrolled in the larger and more definitive Study #3, were substantially less well and took substantially longer to be weaned from supplemental oxygen therapy.

Since different patient populations were used in each study, and since, different questions were addressed in each study necessitating slightly different formula compostions, the results for each of these studies are discussed individually below. The common link between each of these studies, however, was that the experiment test formula is a high fat, low carbohydrate composition specifically formulated to not only support infant growth but also to reduce carbon dioxide production. The specific goals of each of the studies is summarized below:

STUDY 1: This study evaluated the effect on energy metabolism and pulmonary function of feeding low birth weight infants a high fat, low carbohydrate diet. The infants enrolled in this study were assessed for 14 days only.

STUDY 2: This study evaluated the effect on energy metabolism and pulmonary function of feeding low birth weight infants a high fat, low carbohydrate diet. Since the infants enrolled in this study were fed the indicated diet for a period of 8–12 weeks, this study also evaluated the effect of this diet on long term growth.

STUDY 3: This substantially larger study evaluated the long term effect of feeding infants a high fat, low carbohydrate diet. Infants enrolled in this study were fed the indicated diet for a period of about 8–12 weeks. Energy metabolism, pulmonary function and long term growth were assessed.

Study #1

This study was specifically designed to assess carbon dioxide production in low birth weight infants fed a high fat, low carbohydrate formula (BPD30) versus $CO_2$ production in infants fed a lower fat, higher carbohydrate formula. The latter was a modified SSC24 formula, the modification comprising supplementing SSC24 with glucose polymers (Polycose®). (SSC24 is a commercially available product of Ross Products Division of Abbott Laboratories). This supplementation increased the percent of calories derived from carbohydrate from 42% to 52% and decreased the fat derived calories from 47% to 41%. This formula had an identical vitamin and mineral composition to that previously described for SSC24. However the caloric density of this material, due to the Polycose® supplementation, was increased from 24 kilocalories/fl. ounce for SSC24 to 27 kilocalories/fl. ounce. Hence, this composition is hereinafter referred to as SSC27.

Study design: Eight infants diagnosed with BPD were enrolled in a randomized, crossover, balance study. The infants were randomly divided into two groups. The first group consisted of five infants which were fed BPD30 for seven days and then switched to SSC27 feeding for a further seven days. The second group, consisting of three infants, were initially fed SSC27 for seven days and then switched to BPD30 for a further seven days.

During the fourteen day study period the infants were assessed for formula tolerance and intake level and blood chemistry. However, in addition, the rates of respiratory gas exchange ($VO_2$ and $VCO_2$) were measured using indirect calorimetery. The respiratory quotient (RQ) was also determined.

Results:

No significant differences were noted in formula tolerance and intake, etc. when the infants were fed BPD30 versus SSC27. A tabulated summary of the calorimetry results is given below. The term PER1 or PER2 refers to the seven day period the infants were fed the formulas. PER1 refers to the first seven day period when the infants were fed the first of the indicated formulas and PER2 refers to the second seven day period when the infants were fed the second formula.

TABLE 5

| Formula fed | Respiratory Gas Exchange Rates | | | | | | | |
|---|---|---|---|---|---|---|---|---|
| | $VO_2$/kg(mL/kg/min) | | | $VCO_2$/kg(mL/kg/min) | | | Respiratory Q. | |
| | Baseline | Per 1 | Per 2 | Baseline | Per 1 | Per 2 | Per 1 | Per 2 |
| a) All Activity Levels: BPD30-SSC27* | | | | | | | | |
| Mean | 9.6 | 8.9 | 9.0 | 9.3 | 7.8$^a$ | 8.5$^b$ | 0.85$^{a,c}$ | 0.94$^{b,d}$ |
| Median | 9.4 | 8.5 | 8.7 | 9.2 | 7.6 | 8.2 | 0.85 | 0.93 |
| SEM | 1.0 | 1.0 | 0.6 | 0.7 | 0.6 | 0.5 | 0.02 | 0.00 |
| # Subjects | 4 | 5 | 5 | 4 | 5 | 5 | 5 | 5 |
| SSC27-BPD30* | | | | | | | | |
| Mean | 8.0 | 8.1 | 7.8 | 7.9 | 8.2$^b$ | 7.1$^a$ | 1.00$^{b,e}$ | 0.86$^{a,f}$ |

TABLE 5-continued

| | Respiratory Gas Exchange Rates | | | | | | | |
| | $VO_2$/kg(mL/kg/min) | | | $VCO_2$/kg(mL/kg/min) | | | Respiratory Q. | |
| Formula fed | Baseline | Per 1 | Per 2 | Baseline | Per 1 | Per 2 | Per 1 | Per 2 |
|---|---|---|---|---|---|---|---|---|
| Median | 7.6 | 8.5 | 7.2 | 7.8 | 8.3 | 7.0 | 0.99 | 0.86 |
| SEM | 1.1 | 0.7 | 0.8 | 1.0 | 0.6 | 0.3 | 0.03 | 0.03 |
| # Subjects | 3 | 3 | 3 | 3 | 3 | 3 | 3 | 3 |

Values shown are statistically significant differences at the indicated levels of significance.
a<b; p<0.1
a<b; p<0.001
c>d; p<0.01
e>f; p<0.05
b) Quiet and Asleep:

| BPD30-SSC27* | | | | | | | | |
|---|---|---|---|---|---|---|---|---|
| Mean | 9.1 | 8.6 | 8.9 | 8.7 | 7.3 | 8.2 | 0.84 | 0.91 |
| Median | 8.5 | 8.2 | 8.7 | 8.1 | 7.3 | 7.9 | 0.87 | 0.92 |
| SEM | 1.3 | 1.2 | 0.8 | 0.8 | 0.6 | 0.7 | 0.03 | 0.01 |
| # Subjects | 4 | 5 | 4 | 4 | 5 | 4 | 5 | 4 |
| SSC27-BPD30* | | | | | | | | |
| Mean | 8.3 | 8.1 | 7.5 | 7.8 | 8.0 | 6.9 | 0.99 | 0.85 |
| Median | 8.6 | 8.4 | 7.2 | 7.8 | 8.2 | 6.8 | 0.97 | 0.85 |
| SEM | 1.1 | 0.7 | 0.9 | 1.0 | 0.6 | 0.4 | 0.03 | 0.01 |
| # Subjects | 3 | 3 | 3 | 3 | 3 | 3 | 3 | 3 |

*Sequence in which the formulas were fed.

As shown in Table 5, there is a highly significant difference in mean $CO_2$ production ($VCO_2$) and respiratory quotient depending on whether the infant was receiving BPD30 or SSC27. For infants initially fed BPD30 followed by SSC27, $CO_2$ production ($VCO_2$/kg) increased from 7.8±0.6 mL/kg/minute when fed BPD30 to 8.5 mL/kg/minute when fed SSC27. For infants initially fed SSC27 followed by BPD30, $CO_2$ production decreased from 8.2±0.6 mL/kg/minute to 7.1±0.3 mL/kg/minute when switched to the BPD30 formula.

To minimize the effect of activity on the calorimetry results, data were also compared only at those times when the infant was quiet and asleep. Again, $CO_2$ production increased from 7.3±0.6 mL/kg/minute to 8.2±0.7 mL/kg/minute when the infants were switched from initially receiving BPD30 to then receiving SSC27. For the group initially fed SSC27, $VCO_2$/kg decreased from 8.0±0.6 mL/kg/minute to 6.9±0.4 mL/kg/minute when switched to the BPD30 formula. Further, as also shown in Table 5 the changes in RQ followed the same pattern as discussed above.

Conclusions: The results of this study clearly demonstrate that when there is a desire to restrict fluid intake, increase caloric intake, and also to decrease the excretory burden on the lungs, that a high fat, low carbohydrate, calorically dense formula can be safely fed to human infants with compromised lung function. Feeding the BPD30 product of the instant Invention, results in normal growth, formula tolerance and intake, and decreased $CO_2$ production. Thus the need for, and risk of contamination associated with, adding caloric supplements to currently available infants formulas is obviated.

Study #2

The potential benefits of feeding low birth weight infants a low carbohydrate, high fat infant formula were further evaluated by determining the effect of nutritional composition on the work of breathing, age at which the infants no longer required ventilatory support and oxygen supplementation. Specifically this study was designed to evaluate the effect of non-protein energy sources and protein/energy ratio of the infant formula on infant growth, body composition, and recovery from lung disease.

Study Design: Twenty-four preterm low birth-weight infants, clinically diagnosed with respiratory distress and requiring mechanical ventilation, were enrolled in a double blind, randomized trial. The infants were randomly assigned to receive one of three isocaloric nutrient formulas. Eight infants were randomly assigned to each group. The formulas were fed until the infant attained a weight of 2.5 kg or until the time of hospital discharge whichever occured first. The infants were assessed for daily weight and weight gain, formula intake and tolerance, weekly anthropometric measurements, extent of ventilatory and oxygen support required, rates of respiratory gas exchange ($VO_2$, $VCO_2$, minute ventilation & work of breathing) and time to reach adequate independent pulmonary function (age off ventilator support; age off supplemental oxygen).

One of the formulas fed to the enrolled infants was a low fat, high carbohydrate infant formula, hereinafter referred to as F1, and the other two formulas, hereinafter referred to as F2 and F3 respectively, were high fat, low carbohydrate formulas. F2 and F3 differed from each other in that F3 contained approximately 20% more protein. The caloric density of each of these compositions was 24 kilocalories/fl. ounce (0.81 kcal/mL). The vitamin and mineral content of each of these formulas is the same as previously described for SSC24 and/or BPD30. The macronutrient composition of the three formulas is summarized in Table 6.

TABLE 6

| Macronutrient Composition of Experimental Infant Formulas | | | |
| | F1 | F2 (Ivention) | F3 |
|---|---|---|---|
| Protein (g/Liter) | 22 | 22 | 27 |
| Fat (g/Liter) | 25 | 58 | 55 |
| Carbohydrates (g/Liter) | 126 | 54 | 53 |
| Minerals (g/Liter) | 5 | 5 | 5 |
| Caloric source (%) | | | |
| Protein | 15 | 15 | 18 |
| Fat | 26 | 60 | 58 |
| Carbohydrate | 59 | 25 | 24 |
| Protein/energy (g/100 kcal) | 27 | 27 | 34 |

It should be noted that the relative proportions of the macronutrients contained in formulas F2 and F3 are similar to the macronutrient composition previously described in Table 4 for BPD30. The primary difference between F2 and F3 and BPD30 is that the formulas are not isocaloric: BPD30 has a caloric density of 30 kilocalories/fl. ounce (1.0 kcal/mL) whereas F2 and F3 have a caloric density of only 24 kilocalories/fl. ounce (0.8 kcal/mL). Further F2 and F3 are lacking in the high inositol concentration previously described for BPD30. With the exception of caloric density and inositol concentration, F2 corresponds to the BPD30 product of the invention.

Results: The clinical results from this study are summarized in Tables 7a and 7b.

TABLE 7a
GROWTH AND ANTHROPOMETRY MEASUREMENTS: MEAN (Std. Dev)

| Formula Fed: | F1 | F2 (Invention) | F3 |
|---|---|---|---|
| Age to double birth weight (days) | 67(14) | 65(8) | 61(7) |
| Weight gain (grams/kd/day) | 16.3(3.2) | 16.9(2.2) | 15.4(3.4) |
| Length Gain (mm/kd/day) | 0.9(0.3) | 1.0(0.2) | 0.9(0.2) |
| Head Circumferance Gain (mm/kg/day) | 0.8(0.4) | 0.9(0.1) | 0.9(0.2) |
| Skinfold Thickness (mm/kg/day) | 0.12(0.05) | 0.16(0.04)* | 0.11(0.05) |
| Fat Storage (g/kg/day) | 4.2(4.2) | 4.8(3.1) | 6.3(3.9) |
| Energy Storage (kcal/kg/day) | 47(15) | 40(9) | 39(14) |
| Energy Storage/Weight Gain (kcal/g) | 2.9(0.9) | 2.4(0.5) | 2.6(1.1) |

*Significantly greater than F3

TABLE 7b
RESPIRATORY GAS EXCHANGE AND VENTILATION: MEAN (STD. DEV.)

| Infant Formula Fed: | F1 | F2 (Invention) | F3 |
|---|---|---|---|
| $CO_2$ Production (mL/kg/minute) | 10.2(1.6)* | 8.4(1.5) | 7.5(0.9) |
| $O_2$ Consumption (mL/kg/minute) | 11.6(4.8) | 9.4(1.7) | 8.1(2.0) |
| Minute ventilation (mL/kg/minute) | 373(130) | 438(225) | 471(168) |
| Work of Breathing (g/cm/kg) | 59(36) | 42(20) | 26(8) |
| Age Off Ventilator (days, median) | 52 | 33 | 28 |
| Age Off Oxygen (day, median) | 196 | 66 | 73 |

*statistically different from the other formula groups at the 95% confidence level.

It is clear from the results tabulated above that the various infant formulas (F1,F2,F3) generated no significant differences in water intake, energy intake, infant growth, body composition, minute ventilation, or oxygen consumption. However as shown in Table 7b, infants fed either of the two high fat, low carbohydrate formulas (F2 or F3) had a significantly lower $CO_2$ production and work of breathing as compared to infants receiving the low fat, high carbohydrate formula. Also, the age at which oxygen supplementation or ventilatory support was no longer required is reduced in the case of infants receiving either F2 or F3 as compared to those infants receiving the F1 formula.

Conclusions: In comparison to infants fed the high carbohydrate, low fat formula (F1), infants fed the high fat, low carbohydrate infant formulas (F2 and F3) exhibited lower $CO_2$ production, decreased work of breathing, and clinical trends strongly suggestive of improved long term recovery from respiratory distress since those infants exhibited shorter periods of requiring ventilatory and oxygen support. These results indicate that the high fat, low carbohydrate formulas (F2 and F3) enhance ventilatory function and promote more rapid recovery from lung disease in preterm infants.

Study #3.

A substantially larger, double-blind randomized clinical study was undertaken to more definitely define the potential advantages of feeding low birth-weight infants with chronic lung dysfunction a high fat, low carbohydrate infant nutritional formula. More specifically, the following study was designed to determine the efficacy of using the BPD30 formula in the management of infants having pulmonary problems.

The BPD30 product of the instant Invention was evaluated clinically in order to determine its effect on long term growth, formula tolerance, acid/base status, pulmonary function and serum biochemistries of preterm infants with bronchopulmonary dysplasia (BPD) receiving BPD30 as their nutritional source. The results of this study for infants receiving BPD30 were compared with the results for the same outcome measures for other similar low birth weight preterm infants with BPD receiving either Similac Special Care 24 (hereinafter referred to as SSC24) or a hypercaloric blend of Similac Special Care 24 which had 30 kcal per fluid ounce. This SSC blend, hereinafter referred to as SSC30, differs from BPD30 in that it is not a high fat, low carbohydrate composition. The proportion of calories derived from the macronutrients in SSC24 and SSC30 was 11% protein, 47% fat and 42% carbohydrate. In BPD 30 the relative levels were 11% protein, 67% fat and 22% carbohydrate.

Study Design: A double-blind, randomized, parallel study was conducted in forty (40) hospitalized low-birth weight infants having clinically diagnosed bronchopulmonary dysplasia or BPD. Fourteen (14) of these infants received SSC24, twelve (12) received SSC30 and fourteen (14) received BPD30. The infant subjects remained in the study for sixteen (16) weeks or until discharged from hospital.

a) Subjects: Infants enrolled in the study had a birthweight of 600–1385 grams and required mechanical ventilation to support pulmonary function during the first week of life. These infants continued to need supplemental oxygen for more than 14 days during the first 2 months of life. Radiographic pulmonary changes were indicative of bronchopulmonary dysplasia at ages of less than 28 days. All infants were less than 60 days of age (range 28–60 days) upon enrollment into the study and receiving oral feeds at entry. Gestational age ranged from 24–29 weeks. By day 28 all enrolled infants were receiving at least 60 milliliters per kilogram of body weight per day of specified formula and during the study, less than 50% of total ingested calories were derived from intravenous sources during any 2 week period.

b) Principal Outcome Variables: Outcome variables included growth, intake, stool patterns, acid-base status, protein status indicators, serum biochemistries and measures of pulmonary function.

Results:

Subjects: Forty-two premature infants diagnosed with bronchopulmonary dysplasia were enrolled into the study. Infants were randomized to receive either clinically labeled SSC24, SSC30 or BPD30. Randomized groups did not differ when compared by gender, ethnicity, gestational appropriateness, gestational age, Apgar score and age at entry.

Birth weights ranged from 600 to 1385 g with a mean birth weight of 790±32 g for the BPD30 group, 803±64 g for the SSC30 group and 795±45 g for the SSC24 group. Birth weights and lengths did not differ by feeding group but were significantly lower for the female subjects; discharge weights were not significantly different between sexes.

As would be expected for very low birth weight preterm infants, the infants enrolled in the study had complicated clinical histories in addition to chronic lung disease. Most were treated for patent ductus arteriosus, retinopathy of prematurity, and sepsis. Twelve infants were reported to have received surfactant at birth. A mean of 2 medications per day was administered to each subject throughout the study. Frequency of usage did not differ significantly among the groups nor did type of medication differ from group to group.

Nutrient Intake: Daily volume of intake (oral and combined oral and intravenous) and daily volume of adjusted total intake did not differ by group at weeks 1 through 4. Infants received an average of 105 mL of formula daily during week 1 of the study which increased to approximately 150 mL by study day 28 which was the feeding goal. At weeks 5 through 8, total volume of adjusted intake was greater for the group fed SSC24 than the group fed SSC30.

During the week 2 interval, infants fed BPD30 had a greater total adjusted energy intake than infants fed SSC24. No significant difference existed at the week 3–4 interval but at week 5–8, the total adjusted energy intakes of infants fed either BPD30 or SSC30 were greater than of infants fed SSC24.

Anthropometrics: Analyses of anthropometrics were done for all comparisons for which there were 50 percent or more of the subjects who successfully completed the study. At Study Day 1 there were significant differences between feeding groups as to sex, weight, length and head circumference. In order to adjust for these initial differences, analyses of weight, length, and head circumference measures and gains were done by two-way analysis of covariance, using the Study Day 1 value as the covariate. No statistically significant differences were found among groups in weight or length gain or average study weight from Study Day 1 to discharge (Table 8).

TABLE 8

| ADJUSTED WEIGHT CHANGES FOR STUDY PERIODS* | | | |
|---|---|---|---|
| Formula Fed | Days in Study | Weight Gain (g/day) | Average Weight (g) |
| BPD30 (Invention) | 54.4(5.4) [14] | 23.7(1.6) [13] | 1574(64.2) [13] |
| SSC30 (Control) | 58.8(5.5) | 26.5(1.4) | 1698.3(58.4) |
| SSC24 (Control) | 60.2(6.2) [14] | 24.2(1.6) [13] | 1661.7(66.5) [13] |

*Least squares mean adjusted for study day 1 weight and gender. (Standard Error of the Mean); [Number of subjects].

Serum Biochemistries: There were no significant differences among the groups in response to the study feedings from baseline to day 28 for indicators of acid-base status, measures of mineral status, electrolytes, and triglycerides except that at day 14 infants fed BPD30 had greater serum albumin concentrations than infants fed SSC24.

Tolerance: Volume, number of aspirates and percent days with aspirates did not differ among the groups except that at week 3–4 infants fed SSC30 had a greater number of aspirates than infants fed SSC24 or BPD30. Number of stools per day did not differ among the groups at any of the time intervals except week 3–4 when infants fed BPD30 stooled more per day than infants fed SSC30. From week 5–8 onward no differences existed between the groups.

Pulmonary Function: Pulmonary function measures were conducted with 14 infants fed BPD30, 12 infants fed SSC24 and 12 infants fed SSC30. The results for this study are given in Table 9. Infants for whom pulmonary functions were available were fed study formula for a mean length of 46–57 days. Fractional inspired oxygen concentration ranged from 21 (normal) to 45 percent during the first month of the study with no differences among the groups. The mean for each group was approximately 25 percent at each weekly interval.

TABLE 9

| | PULMONARY FUNCTION TESTS* | | | | | |
|---|---|---|---|---|---|---|
| | BPD30 (Invention) | | SSC30 (Control) | | SSC24 (Control) | |
| Formula Fed: | Initial | End | Initial | End | Initial | End |
| Minute Ventilation (mL/kg/minute) | 477 (45)[13] | 402 (18) | 506 (26)[12] | 434 (25) | 431 (29)[12] | 397 (29) |
| Tidal Volume (mL/kg) | 6.8 (0.5) | 6.0 (0.3) | 7.0 (.03) | 6.2 (0.1) | 7.0 (0.5) | 6.4 (0.3) |
| Pulmonary Compliance (mL/cm/$H_2O$/kg) | 0.76 (0.07) | 0.82 (0.1) | 0.81 (0.09) | 0.73 (0.05) | 0.67 (0.07) | 0.74 (0.03) |
| Resistance (mc/$H_2O$/L/sec) | 130 (12) | 124 (14) | 135 (14) | 104 (11) | 135 (14) | 136 (14) |
| Functional Residual Capacity (mL/kg) | 18.2 (3) | 17.6 (8) | 15.6 (5) | 14.7 (9) | 12.2 (3) | 15.4 (9) |

*Tabulated values given are: Mean Values; (Standard Error of the Mean); [Number of Subjects]

No significant differences were found among the groups for initial or end measures of adjusted minute ventilation (mL/kg/min), tidal volume (mL/kg), lung compliance (mL/cm $H_2O$/kg), functional residual capacity (FRC; mL/kg) and pulmonary resistance (cm $H_2O$/L/sec) (Table 9). Adjusted minute ventilation decreased for all groups over time. During the 2 months of the study, adjusted tidal volume did not increase. Lung compliance was low, pulmonary resistance was high and end FRC was low for all groups. Initial FRC measurements were not complete for any of the groups and several infants did not have end FRC measures At entry the group of infants randomized to receive BPD30 had significantly lower $VO_2$/kg and a greater percentage on the ventilator (71.4%) than infants in the other feeding groups (33.3–35.7%). By Study Day 28, the percentage of infants on the ventilator had decreased to 14.3% for the group fed BPD30 and 64.3% were on room air.

General Conclusions From Studies 1–3

The results of aforenoted studies clearly indicate that low birth weight preterm infants benefit considerably from being fed the high fat, calorically more dense BPD30 infant formula of the instant invention since the BPD30 formula provides greater energy in less volume to infants with BPD who are likely to be fluid restricted and also to have elevated energy requirements. More specifically the advantages of feeding preterm BPD infants the high fat, low carbohydrate BPD30 formula include: significantly reduced $VCO_2$ and respiratory quotients and markedly reduced $CO_2$ production as compared to infants receiving SSC24 or calorically supplemented SSC24 (i.e. SSC27 or SSC30). Work of breathing was also reduced in infants fed the high fat formulas in Study 2.

No disadvantages occur from feeding low birth weight preterm infants the high fat, low carbohydrate formulation (BP30) of the instant Invention. No differences in growth, serum biochemistries, formula tolerance, time to achieve full feed, etc., were seen in infants receiving BPD30 versus SSC24 or calorically supplemented SSC24.

Thus it is concluded that the high fat, high inositol and low carbohydrate preterm infant formula of the instant Invention having an increased caloric density provides greater energy in less volume to infants with BPD who are likely to be fluid restricted and also to have elevated nutrient (energy) requirements. Infants in the studies fed BPD30 grew as well as infants fed traditional preterm formulations, maintained normal serum biochemistries and tolerated the formula well. Infants receiving BPD30 exhibited markedly lowered ventilatory requirements, substantially diminished $CO_2$ production levels and improved work of breathing.

MANUFACTURE OF THE PRODUCT

A method for manufacturing the BPD30 product of the instant Invention is described next.

EXAMPLE 4

The process of manufacturing the liquid nutritional product for enteral feeding of the present Invention begins with the preparation of an oil blend containing the oils, emulsifier, oil soluble vitamins and stabilizer. Next, a carbohydrate/mineral slurry and a protein solution are formed. Then a slurry is prepared by combining the carbohydrate/mineral slurry, water, oil blend and protein solution. The slurry is then homogenized, heat processed, standardized with vitamins and terminally sterilized.

As prepared, the formula contains appropiate nutrients in compliance with the Infant Formula Act (U.S.A.) as of the date of this Invention. It should also be recognized that the unique formula of this Invention could be prepared for use in the powdered form or as a concentrated liquid.

An example of a method for producing a batch of the new product is described below. While the product of the instant Invention comprises essentially the same ingredients as control SSC24 formula, the relative proportions of those ingredients are markedly different. The quantities of ingredients required for the preparation of 11,000 pound (4,989 kg) batch of the new product is given in Table 10.

TABLE 10

INGREDIENTS FOR 11,000 POUND (4,989 kg) BATCH OF BPD30 PRODUCT

| INGREDIENT | QUANTITY | |
|---|---|---|
| Water | 9167 lbs | (4157.9 kg) |
| Blend of 60% soy and 40% coconut oil | 808.6 lbs | (366.8 kg) |
| Lecitin | 8.1 lbs | (3.674 kg) |
| Monoglycerides | 8.1 lbs | (3.674 kg) |
| Oil Soluble Vitamin Premix | 1.17 lbs | (532.4 g) |
| Whey Protein Concentrate | 238.3 lbs | (108.1 kg) |
| Carrageenan | 2.2 lbs | (1.0 kg) |
| Calcium Carbonate | 10.4 lbs | (4.72 kg) |
| Tricalcium Phosphate | 16.8 lbs | (7.62 kg) |
| Sodium Citrate | 4.0 lbs | (1.81 kg) |
| Potassium Citrate | 7.8 lbs | (3.54 kg) |
| Magnesium Chloride | 6.8 lbs | (3.08 kg) |
| Potassium Chloride | 1.23 lbs | (558.7 g) |
| Lactose | 5.0 lbs | (2.27 kg) |
| Hydrolized Corn Starch | 292.5 lbs | (132.68 kg) |
| Low Heat Non-Fat Dry Milk | 406.8 lbs | (184.5 kg) |
| Potassium Citrate | 0.014 lbs | (6.2 g) |
| Ferrous Sulfate | 0.104 lbs | (47.2 g) |
| Water Soluble Vitamin Premix | 3.368 lbs | (1527.5 g) |
| Choline Chloride | 0.954 lbs | (432.7 g) |
| L-Carnitine | 0.697 lbs | (316.0 g) |
| m-Inositol | 4.443 lbs | (2015.5 g) |
| Ascorbic Acid | 5.893 lbs | (2673.0 g) |
| Sodium Selenate | 0.00087 lbs | (0.395 g) |

A specific method for preparing an 11,000 pound (4,989 kilograms) batch of the BPD30 product of the instant Invention is described below. This detailed description is given for the clearness of understanding only, and no unnecessary limitations should be understood herefrom, as aspects and advantages within the scope of the present invention will be apparent to those skilled in the art.

Step 1: Prepare an oil blend

Place 808.6 lbs (366.8 kg) of the blend oil in a blend tank and heat it to a temperature in the range of 160° to 170° F. (71°–76.7° C.). Add Lecithin and Myverol to the oil and mix well. Add the oil soluble vitamin premix and mix well. Allow the oil blend to cool to a temperature in the range of 130° to 140° F. (54.4°–60° C.) and hold the blend at this temperature under slow agitation.

Step 2: Prepare a Carbohydrate/Mineral Slurry

Place 1060 lbs (480.8 kg) of water in a slurry tank and heat it to a temperature in the range of 130°–140° F. (54.4°–60° C.). Add potassium citrate, sodium citrate, magnesium chloride, potassium chloride, 5.0 lbs (2.27 kg) of lactose and 292.5 lbs (132.68 kg) hydrolized corn starch. Blend until dissolved and hold the temperature at 130°–140° F. (54.4°–60° C.).

Step 3: Prepare a Protein Solution

Heat 6000 lbs (2721.6 kg) of water to a temperature in the range of 130°–140° F. (54.4°–60° C.) and add with agitation 406.8 lbs (184.5 kg) of non-fat dry milk powder. Continue to agitate the solution until the powder is completely dissolved. Maintaining the temperature, add 238.3 lbs (108.1 kg)) of whey protein concentrate and agitate until dissolved.

Step 4: Prepare a Slurry of Oil, Carbohydrate, Minerals and Protein.

To the protein solution of Step 3, add the oil blend of step 1 and the carbohydrate/mineral slurry of step 2. Hold the resultant slurry under constant agitation at a temperature in the range of 130° to 140° F. (54.4°–60°

C.) and add calcium carbonate and tricalcium phosphate.

Step 5: Adjust pH of the Slurry

Determine the pH of the slurry which was produced in STEP 4. The desired pH of the slurry is in the range of 6.50 to 6.70. If the pH of the slurry is less than 6.50 add a sufficient quantity of a 45% potassium hydroxide solution to adjust the pH of the slurry to about the middle of the desired range. Hold the slurry under agitation at a temperature in the range of 130° to 140° F. (54.4°–60° C.) for at least fifteen minutes, preferably avoiding any excess agitation that would cause entrainment of air in the slurry.

Step 6: Processing

The slurry is processed continuously including homogenization and a high temperature-short time (HTST) heat treatment. The product is heated to 165°–175° F. (74°–79.4° C.) deaerated, emulsified, and homogenized. The product is then heated to a minimum of 165° F. (74° C.) and held for at least 18 seconds before cooling. The batch is held cooled while nutrient levels are measured. If needed, nutrient levels are adjusted to meet product specifications. The water soluble vitamin premix, the ferrous sulfate, choline chloride, L-carnitine, m-Inositol and ascorbic acid are dissolved in 140° F. (60° C.) water (approximately 200 lbs; 90.7 kg) and added to the product. Water is added to bring the product to the specified total solids level (approximately 1900 lbs; 862 kg). The product in then placed in suitable containers and sterilized.

A preferred embodiment of the present invention has: about 10.0% to about 15.0%, most preferably about 11% of the total calories in the product provided by protein; about 20% to about 27.0%, most preferably about 22% of the total calories in the product provided by carbohydrate; and about 60% to about 70%, most preferably about 67% of the total calories in the product provided by fat. Put another way, a liquid nutritional product for enteral feeding in accordance with a preferred embodiment of the present invention contains: about 26.0 g/liter (g/L) to about 34 g/L, most preferably about 28 g/L of protein; about 45 g/L to about 70 g/L, most preferably about 56 g/L of carbohydrate; and about 65 g/L to about 80 g/L, most preferably about 76 g/L provided by fat.

The source of fat in the liquid nutritional is a lipid blend wherein the oils may be selected from the group consisting of medium chain triglycerides, long chain triglycerides, soy oil, coconut oil, safflower oil, high oleic safflower oil, structured lipids, marine oil, phospholipids and lecithin. The preferred source of fat in the liquid nutritional product is a lipid blend comprising coconut and soy oils which has been described above in detail.

The preferred sources of protein in the liquid nutritional product of the present invention are non-fat dry milk powder and whey protein. The reason that this is the preferred source of protein is that they both are high quality proteins with high biological value. However; other suitable sources of protein that may be used in the practice of the present invention include milk and soy protein, and hydrolysates thereof.

The preferred sources of carbohydrate in the liquid nutritional product of the present invention are hydrolyzed corn starch and lactose. The reason that these are the preferred sources of carbohydrate is that both simple and complex carbohydrates are provided.

Other ingredients that may be advantageously used in the practice of the present Invention include oligosaccharides, dietary fiber, nucleotides and antioxidants such as beta-carotene.

The pulmonary function of a mammalian creature having respiratory insufficiency may be improved by feeding a liquid nutritional product in accordance with the present invention. The most preferred composition, by weight, of a liquid nutritional product for enteral feeding in accordance with the present invention is set forth in Table 11.

TABLE 11

PREFERRED NUTRITIONAL INFORMATION FOR NEW BPD30 PRODUCT
(Invention) (Values given are per liter)

| NUTRIENT | | Mass per liter |
|---|---|---|
| Nutrient | Protein, g | 28.1 |
| | Fat, g | 74.7 |
| | Carbohydate, g | 56.2 |
| Vitamins | Vitamin A, IU | 7060 |
| | Vitamin D, IU | 1611 |
| | Vitamin E, IU | 40.2 |
| | Vitamin $K_1$, µg | 135 |
| | Thiamine (Vitamin $B_1$), mg | 3.9 |
| | Riboflavin (Vitamin $B_2$), mg | 7.0 |
| | Vitamin $B_6$, mg | 3.2 |
| | Vitamin $B_{12}$, mg | 11.9 |
| | Niacin, mg | 52.4 |
| | Folic Acid (Folacin), µg | 424 |
| | Pantothenic Acid, mg | 25.8 |
| | Biotin, µg | 455 |
| | Vitamin C (Ascorbic Acid), mg | 455 |
| | Choline, mg | 287 |
| | m-Inositol, mg | 500 |
| | L-Carnitine, mg | 69 |
| Minerals | Calcium, mg | 1549 |
| | Phosphorus, mg | 769 |
| | Magnesium, mg | 155 |
| | Iron, mg | 7.2 |
| | Zinc, mg | 17.8 |
| | Manganese, µg | 215 |
| | Copper, mg | 2.8 |
| | Iodine, µg | 118 |
| | Sodium, mg | 356 |
| | Potassium, g | 1.45 |
| | Chloride, mg | 829 |
| | Taurine, mg | 50 |
| | Selenium, µg | 50 |
| | Ca:P Ratio | 1.4–2.2 |

The BPD30 formulation described in Tables 4, 10 & 11 is intended for ingestion by human infants with compromised lung function. The formulation may be fed by mouth or by tube and may be used as a supplement or as a complete diet. While the BPD30 infant formula and method of making said formula herein described constitute a preferred embodiment of this invention, it is to be understood that the invention is not limited to this precise form and that changes may be made therein without departing from the scope of the invention which is defined in the appended claims. The foregoing detailed description is given for the clearness of understanding only, and no unnecessary limitations should be understood therefrom, as aspects and advantages within the scope of the present invention will be apparent to those skilled in the art.

What is claimed is:

1. An infant formula comprising:
   a) protein at a concentration of between 25 and 35 grams per liter of formula;
   b) fat at a concentration of between 65 and 85 grams per liter of formula;

c) carbohydrates at a concentration of between 40 and 75 grams per liter of formula;
d) inositol;
e) a calcium to phosphorous ratio in the range of 1.4 to 2.2;
f) a caloric density of not less than 800 kilocalories/liter and not more than 1200 kilocalories/liter; and
g) wherein at least 56% of said calories in said infant formula are derived from fat and the nutritional product is specially formulated for use in the management of human infants having compromised lung function.

2. The formula as claimed in claim 1 wherein said protein is at a concentration of between 26 and 32 grams per liter of formula, said fat is at a concentration of between 70 and 80 grams per liter of formula; said carbohydrate is at a concentration between 50 and 60 grams per liter of formula; said caloric density is between about 900 and 1100 kilocalories/liter; and wherein at least 60% of said calories are derived from fat.

3. The formula as claimed in claim 2 wherein said protein is provided by at least one material selected from the group consisting of non-fat milk and whey, said fat is provided by at least one material selected from the group consisting of medium chain triglycerides, long chain triglycerides, soy oil, coconut oil, safflower oil, high oleic safflower oil, structured lipids, marine oil, phospholipids and lecithin, and said carbohydrate is provided by at least one material selected from the group consisting of corn syrup, sucrose, glucose polymers, lactose, oligosaccharides.

4. The formula as claimed in claim 3 wherein said protein is provided by non-fat milk and whey, said fat is provided by soy oil and coconut oil, said carbohydrate is provided by corn syrup and lactose.

5. The formula as claimed in claim 1 wherein said protein is at a concentration of between 26 and 29 grams per liter of formula, said fat is at a concentration of between 75 and 78 grams per liter of formula, said carbohydrate is at a concentration of between 55 and 58 grams per liter of formula, said caloric density is between about 975 and 1050 kilocalories/liter; and wherein at least 65% of said calories are derived from fat.

6. The formula as claimed in claim 1 wherein said protein is at a concentration of about 27.9 grams per liter of formula and is provided by a blend of non-fat milk and whey protein, said fat is at a concentration of about 76 grams per liter of formula and is provided by a blend of soy and coconut oils, and said carbohydrate is at a concentration of about 56.5 grams per liter of formula and is provided by a blend lactose and corn syrup, said caloric density being about 1000 kilocalories/liter; and wherein at least about 65% of said calories are derived from fat.

7. The formula as claimed in claim 1 wherein said fat provides not less than about 60% of the calories, said protein provides not more than about 15% of the calories, and said carbohydrate provides not more than about 25% of the calories.

8. The formula as claimed in claim 1 wherein said fat provides not less than about 67% of the calories, said protein provides about 11% of the calories, and said carbohydrate provides about 22% of the calories.

9. The formula as claimed in claim 1 wherein said inositol is at a concentration of between 50 and 800 milligrams per liter of formula.

10. The formula according to claim 9 wherein said inositol is at a concentration of between 400 and 700 milligrams per liter of formula.

11. The formula according to claim 10 wherein said inositol is at a concentration of about 600 milligrams per liter of formula.

12. The formula as claimed in claim 1 further comprising 4 to 7 grams of minerals per liter of formula, wherein said minerals are selected from the group consisting of calcium, phosphorous, magnesium, iron, zinc, manganese, copper, iodine, sodium, potassium, selenium and chloride.

13. The formula as claimed in claim 1 further comprising vitamins selected from the group consisting of vitamin A, C, B1, B2, B6, B12, D, E, K, niacin, folic acid, biotin, pantothenic acid, choline, carnitine, taurine and β-carotene.

* * * * *